F. AESCHBACH.
MACHINE FOR SHAPING PIECES OF DOUGH.
APPLICATION FILED JULY 3, 1916.
1,242,753.
Patented Oct. 9, 1917.
5 SHEETS—SHEET 2.
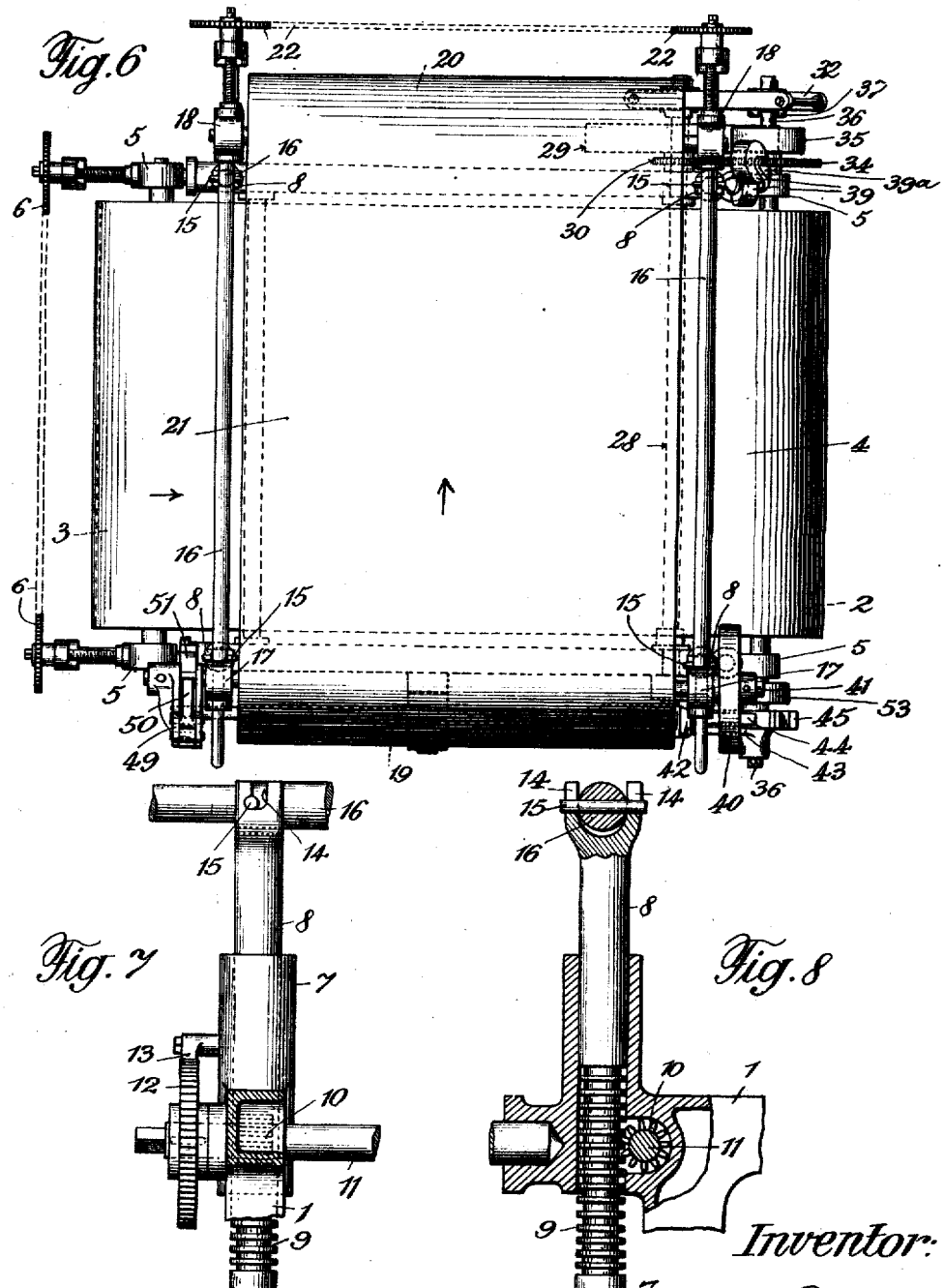
Inventor:
Friedrich Aeschbach,
Atty

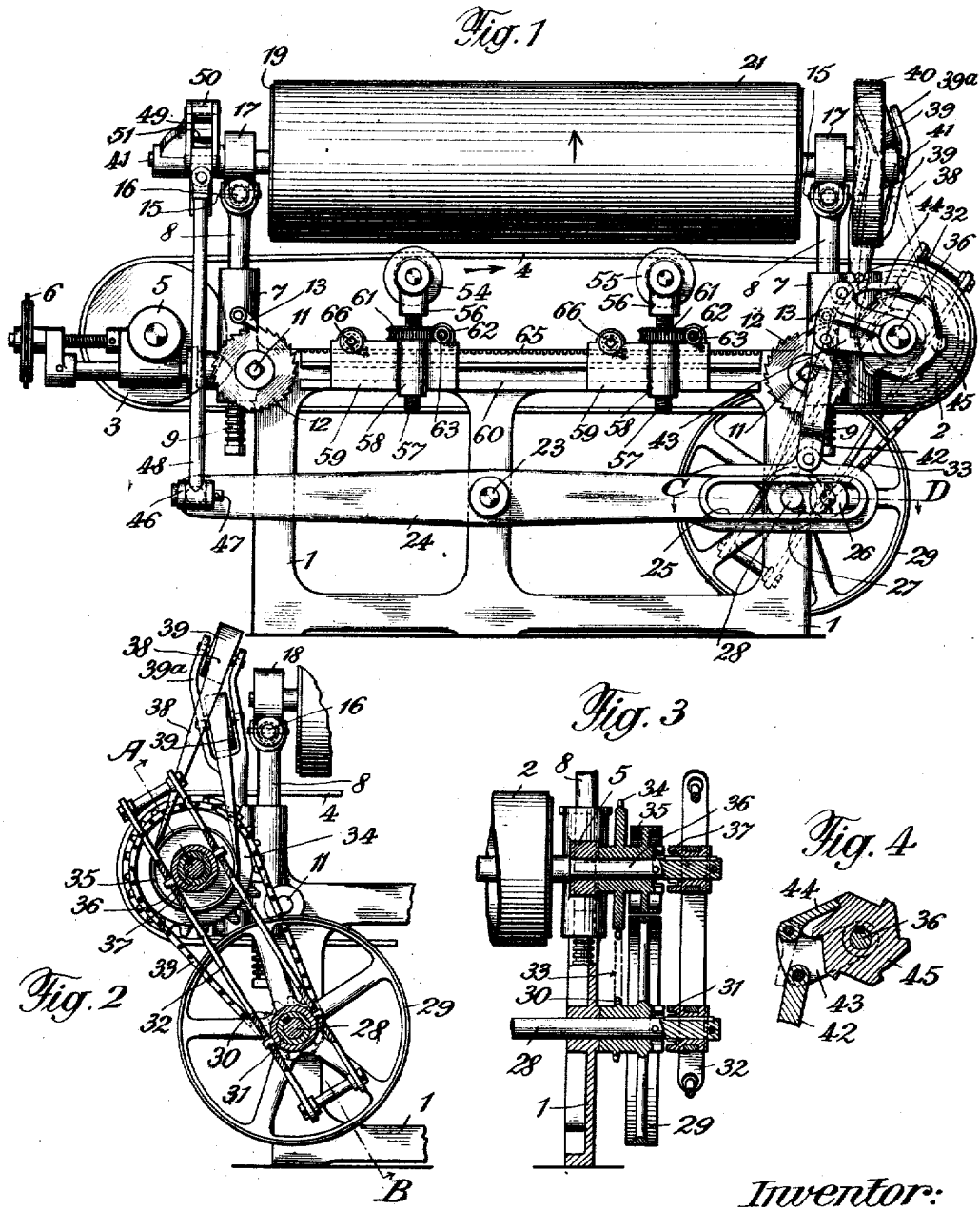

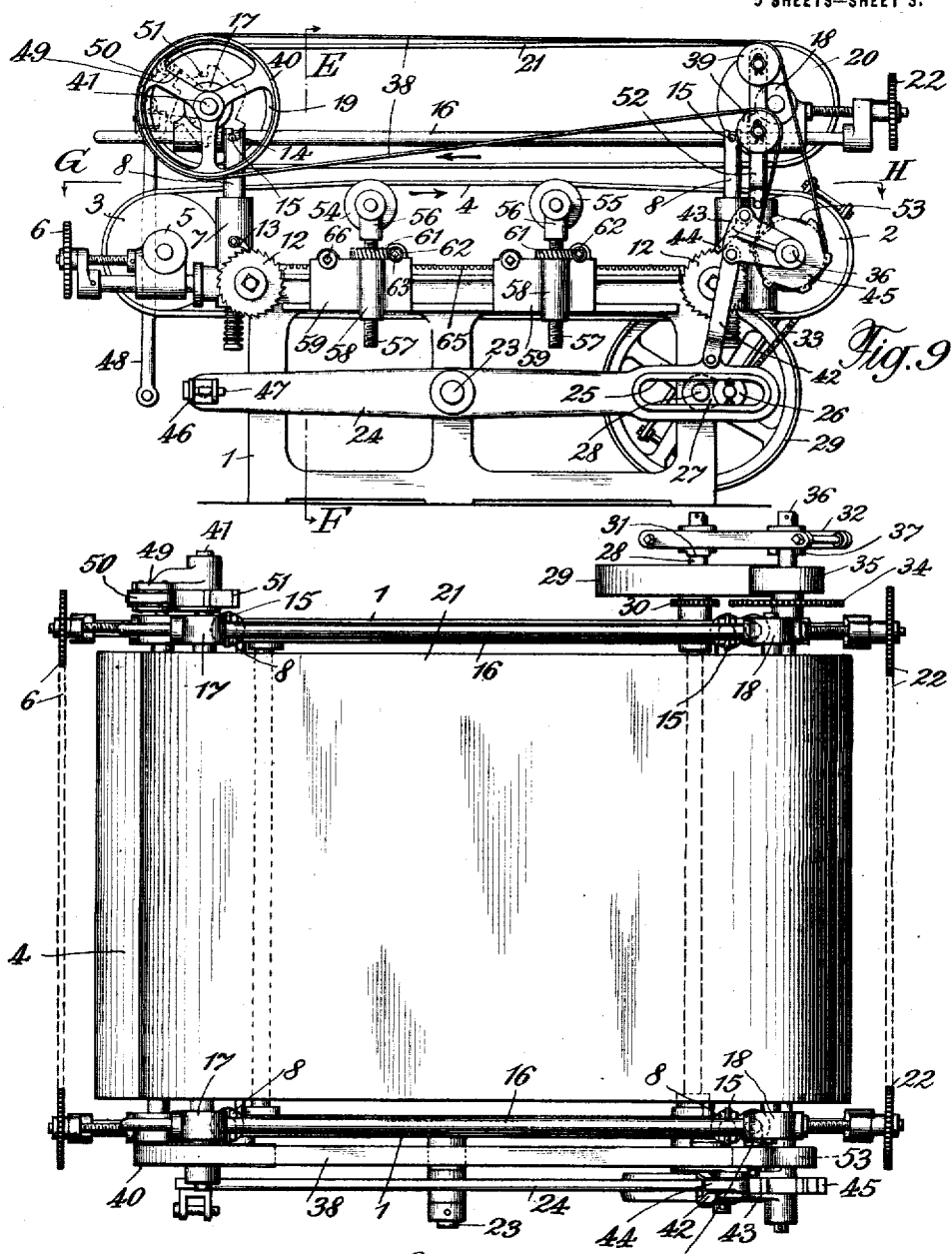

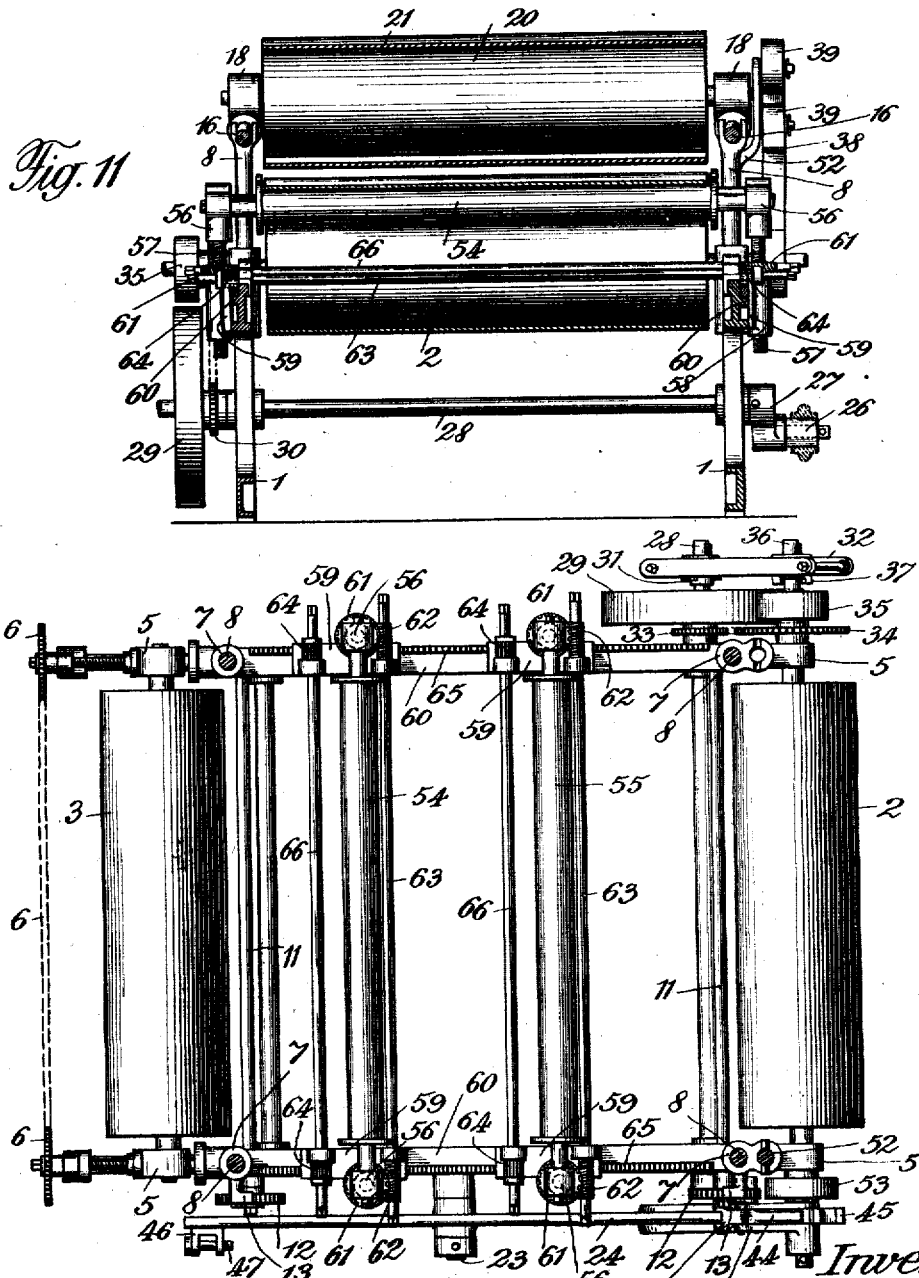

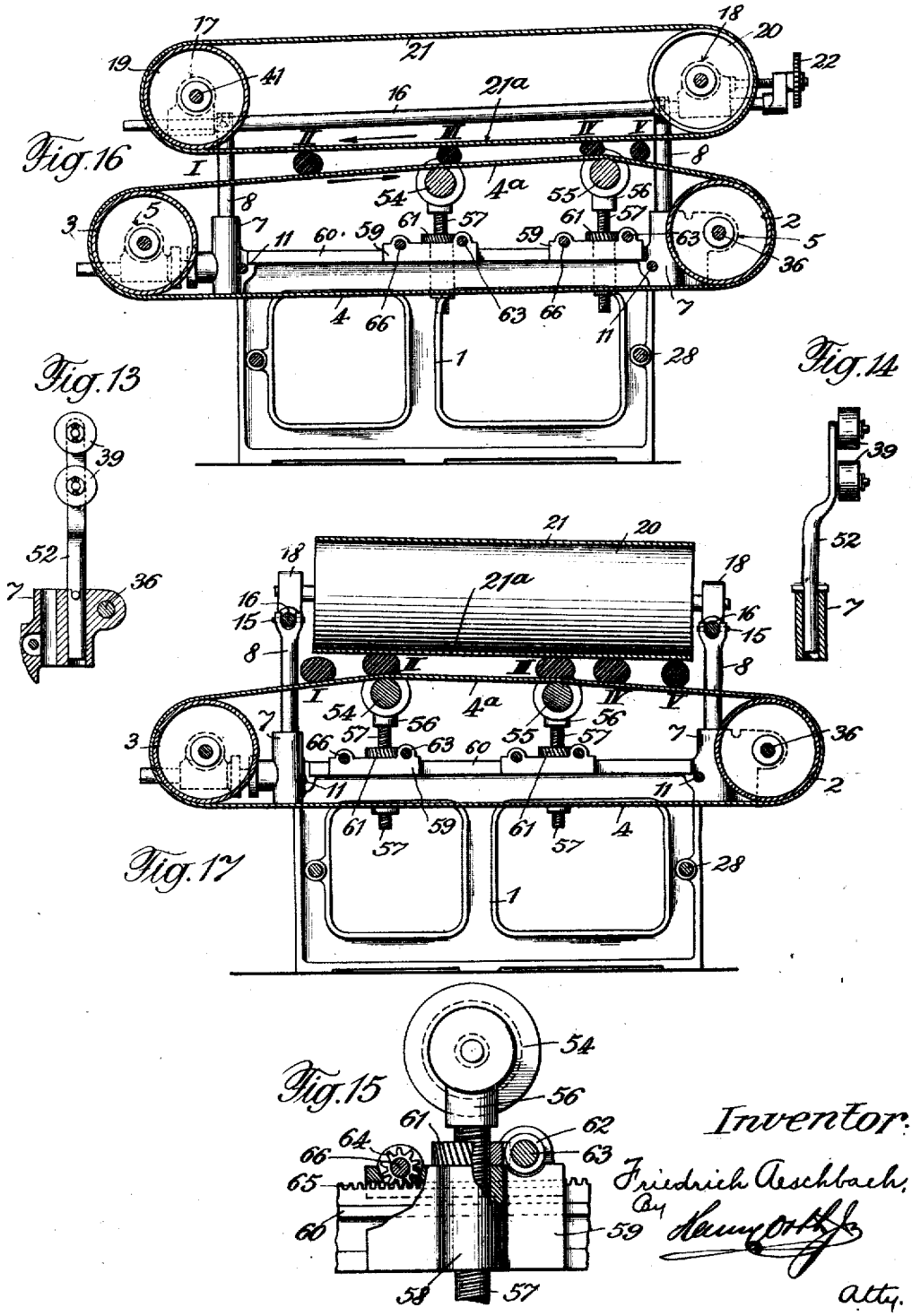

UNITED STATES PATENT OFFICE.

FRIEDRICH AESCHBACH, OF AARAU, SWITZERLAND.

MACHINE FOR SHAPING PIECES OF DOUGH.

1,242,753. Specification of Letters Patent. Patented Oct. 9, 1917.

Application filed July 3, 1916. Serial No. 107,438.

*To all whom it may concern:*

Be it known that I, FRIEDRICH AESCHBACH, a citizen of the Republic of Switzerland, residing at Aarau, Switzerland, have invented certain new and useful Improvements in Machines for Shaping Pieces of Dough; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

There are already known machines for shaping pieces of dough having a pair of endless bands arranged one upon another and between which the dough pieces are shaped.

The present invention has reference to a machine of this type. The machine according to this invention is adapted for being used for different kinds of work and to produce final products of different shape. This is effected partly by transposing and partly by removing and replacing certain parts of the machine.

The accompanying drawings illustrate a convenient mode of carrying the present invention into effect.

Figure 1 shows a side view of the machine,
Fig. 2 shows a detail of Fig. 1,
Fig. 3 is a section on the line A—B of Fig. 2,
Fig. 4 shows a further detail of Fig. 1, and
Fig. 5 a section on the line C—D of Fig. 1,
Fig. 6 shows a plan view of Fig. 1,
Figs. 7 and 8 illustrate details of Fig. 1 partly in front view and partly in section,
Fig. 9 shows the machine illustrated in Fig. 1 after the transposing and replacing of certain parts, and
Fig. 10 shows a corresponding plan view,
Fig. 11 shows a section on the line E—F of Fig. 9, and
Fig. 12 a section on the line G—H of Fig. 9,
Figs. 13 and 14 show an interchangeable part of the machine, while
Fig. 15 shows a further detail of the machine illustrated in Fig. 1,
Figs. 16 and 17 illustrate in particular the manner of operation of the machine in certain special cases.

4 denotes the lower endless band running over the rollers 2, 3 supported in the machine frame 1. For the purpose of stretching the band 4 the bearings 5 of the roller 3 (Fig. 1) may be adjusted in an equal manner by means of a chain drive 6 (Fig. 6). 8 are supports movably mounted in vertical guides 7 (Figs. 1, 7 and 8) provided with annular projections 9 with which mesh small toothed wheels 10. On each side of the machine there is provided a horizontal shaft 11 carrying two of said wheels 10. Each shaft 11 carries at one end also a ratchet wheel 12 working together with a pawl 13. The two supports 8 arranged on the same side of the machine may thus be displaced simultaneously in a vertical direction upon a rotation of one of the shafts 11 (Fig. 12). The upper end of the supports 8 is fork shaped (Figs. 7 and 8) and each of these ends is provided with a slot 14. The lower part of the slots 14 of the supports 8 disposed on the left hand side of the machine is bent sidewards (Fig. 9) in the same manner as it is the case in a bayonet-joint. The slots 14 are adapted to receive the pins 15 of rods 16 carrying the bearings 17 and 18 (Figs. 6, 9, 1) for the rollers 19 and 20. 21 denotes the upper endless band, which runs over the rollers 19 and 20. This band 21 is thus arranged crosswise to the band 4. The bearings 18 may also be adjusted simultaneously and in an equal manner by means of a chain drive 22.

A double-armed lever 24 is pivotally mounted on a gudgeon 23 fixed to the frame 1. One end of this lever 24 has a slot 25 into which projects a sliding block 26 of a crank 27 (Figs. 1 and 5) fixed to a shaft 28. On this shaft 28 is also movably mounted a driving pulley 29 (Figs. 1, 2, 3, 9, 10). To the pulley 29 is rigidly connected a chain wheel 30. The boss of the driving pulley 29 (Fig. 3) forms one half of a clutch, the other half 31 of which is movably mounted in a fork 32 (Figs. 2 and 3), said clutch half 31 being rotated by the shaft 28 upon a rotation of the latter. A chain 33 connects the chain wheel 30 to the chain wheel 34, which is rigidly connected to a pulley 35 and loosely mounted on the shaft 36 of the roller 2. The pulley 35 forms also one half of a clutch. The corresponding other half 37 of this clutch is also movably mounted in the fork 32 and is rotated by the shaft 36 upon a rotation of the latter. An endless belt 38 (Figs. 2, 9 and 10) guided in an appropriate manner by means of pulleys 39 passes over a pulley 40, which is fixed to the shaft 41 of the roller 19. The guide pulleys 39 are movably mounted in a fork 39ª, which may be inserted in a removable manner into the frame of the machine.

To the end of the arm 24 provided with the slot 25 is pivotally connected a lever 42 (Figs. 1, 9 and 4), the upper end of which is pivotally connected to a feeding plate 43 (Figs. 1, 9 and 4) adapted to oscillate about the shaft 36 of the roller 2. To the feeding plate 43 is pivotally mounted a pawl 44 working together with a ratchet wheel 45, which is fixed to the shaft 36.

To the other end of the double-armed lever 24 is movably mounted a lateral fork-like member 46, to which is pivotally secured in a detachable manner by means of a removable pin 47 one end of a rod 48 (Fig. 1), the other end of which is pivotally connected, in the same manner as the lever 42, to a feeding plate 49 (Figs. 1 and 9), which is also provided, in the same manner as the feeding plate 43 shown in Fig. 4, with a pawl 50 working together with a ratchet wheel 51, which is fixed to the shaft 41 of the roller 19.

Let it be assumed, that all parts are in the position shown in Figs. 1–6, and that the belt 38 has been removed and the clutch half 31 thrown into the operative position. Upon a rotation of the driving pulley 29 the crank 27 is then rotated, so that the lever 24 is oscillated upward and downward. Upon a lifting of that end of the lever 24, which in Fig. 1 is on the right hand side, the pawl 44 causes the toothed wheel 45 to rotate to an amount corresponding to the distance between two following teeth of this wheel, so that the band 4 is fed somewhat forward in the direction of the arrow shown in Fig. 1. The pawl 50 slides thereby idle over the ratchet wheel 51 and does not exert any action upon this wheel, so that the band 21 remains stationary. Upon a downward movement of the right hand arm of the lever 24, the left hand arm of the latter is lifted, so that the pawl 44 slides now idle over the wheel 45, so that the band 4 remains stationary while the pawl 50 causes a rotation of the ratchet wheel 51 to an amount corresponding to the distance between two following teeth of this wheel 51, so that a feeding movement is imparted to the band 21 in the direction of the arrows shown in Figs. 1 and 6. The two bands 4 and 21, which in this case are arranged crosswise, are thus moved separately and alternately at the same speed, so that the pieces of dough, which come to lie between these bands, are formed into balls. Under the expression balls there may be understood, of course, also such forms having only approximately the shape of a ball.

Should, however, the belt 38 be passed over the pulleys 35, 39 and 40 and the clutch half 31 thrown out of gear and the clutch half 37 into gear, the chain wheel 30 will cause a rotation of the chain wheel 34 and hence of the shaft 36 and the roller 2 and by means of the belt 38 also of the roller 19, so that the two bands 4 and 21 are no longer moved step by step but in a continual manner. The bands will still move in the direction indicated by the arrows in Figs. 1 and 6, but the band 4 will travel at twice the speed of the band 21, due to the fact that the diameter of the pulley 35 is only half the diameter of the pulley 40. In this case the pieces of dough are rolled in the diagonal direction of the two bands, so that the worked dough pieces leaving the machine have not the shape of balls but of cylinders. It is not absolutely necessary that the bands cross at right angles, these bands may also cross at an acute angle.

It may also happen, that there have to be rolled longer cylinders of dough than it is possible to roll in the described manner by means of crossing endless bands receiving an uninterrupted feed movement. To this end the upper frame formed by the rods 16, the bearings 17, 18 and the cylinders 19 and 20 is lifted out of the slots 14 of the rods 8 (Figs. 7 and 8) upon the removal of the belt 38 and after that the whole frame has been turned horizontally about an angle of 90° the pins 15 of the shafts 16 are again lowered into the slots 14 of the supports 8, so that the bands 4 and 21 are transposed from the position shown in Figs. 1 and 6, in which they are arranged crosswise, into the position shown in Figs. 9 and 10, in which they are parallel. The rod 48 is thereby disconnected from the lever 24, as shown in Fig. 9. Further, the fork 39ª (Fig. 2) carrying the guide pulleys 39 is removed from the machine frame and replaced by an arm 52 (Figs. 13 and 14), which carries also two guide pulleys 39, but has a somewhat different shape. The belt 38 is removed from the pulley 35 and passed over a pulley 53 (Figs. 9 and 10) arranged at the other side of the shaft 36. Moreover, the pawls 44 and 50 are set out of operation. If desired, the whole feeding mechanism 42, 43, 44, 45 may be removed. The band 4 is now continually moved in the direction of the lower arrow shown in Fig. 9, while band 21 is moved in the direction of the upper arrow shown in this Fig. 9, and at half the speed of band 4, as the diameter of pulley 53 is also half the diameter of pulley 40, so that the dough pieces are rolled between these bands into long cylinders giving long bread.

It is not indispensable, that the upper frame be turned through an angle of exactly 90°. From the constructive point of view the frame may also be turned through another angle.

In a machine of the above described type it is also possible to give to the dough pieces different forms without that the prescribed form, which has to be given to the pieces leaving the machine, is affected in any way. This will be best understood by referring to Figs. 16 and 17. 21ª and 4ª are the adjacent parts of the bands 21 and 4, which in Fig. 16 are parallel, while in the arrangement shown in Fig. 17 they are arranged crosswise. As shown, the belt part 21ª forms a stretched straight path, while the part 4ª of the belt 4 is pushed out at certain places of the stretched straight path and moved toward the belt part 21ª, so that the distance betwen the two belt parts 21ª and 4ª is different at different places. Said pushing out is effected by means of cylindrical guide pulleys 54 and 55 (Figs. 1, 9, 15, 16, 17) movably mounted at both ends in bearings 56, which rest on shafts 57. The latter are guided in sleeves 58, fixed to slides 59 adapted to be moved along guide-bars 60. Each shaft 57 works together with a worm-wheel 61, which forms a nut and is adapted to be rotated by means of a worm 62. Suitable means prevent any displacement of said worm-wheels 61 in the axial direction of the shafts 57. The worms 62 of two opposite slides 59 are connected by means of a rod 63 adapted to be rotated by hand. On each slide 59 is also movably mounted a small toothed wheel 64 working together with a rack 65 fixed to the bar 60. Two opposite toothed wheels 64 are always connected by means of a rod 66 adapted to be rotated by hand. Upon a rotation of a shaft 63 it is thus possible to adjust vertically a guide pulley 54, while upon a rotation of a shaft 66 a horizontal adjustment of one of the guide pulleys may be effected.

If the bands 21 and 4 are arranged parallel (Fig. 16) the piece of dough having quite an irregular shape comes at I in contact with the band parts 4ª and 21ª and is then shaped into an approximately cylindrical dough roll II. Hereupon a greater pressure is exerted upon this piece of dough, said pressure increasing from point III to point IV. This increase of the pressure at certain places is particularly of advantage for the treatment of the so called skin of the piece of dough. As soon as the piece of dough is moved behind the guide pulley 55 toward the position V a gradual decrease of the pressure acting upon this piece takes place, so that said piece assumes again more a cylindrical shape.

If the bands 21 and 4 and hence also the adjacent band parts 21ª and 4ª are crossing, as shown in Fig. 16, so that the pieces leaving the machine have not a cylindrical shape but a ball-like one, the piece of dough I fed forward between the band parts 4ª and 21ª is shaped between the positions II to III into a flattened round cake. This piece of dough assumes, however, after having been passed over the guide pulley 55, in the positions IV and V again more a ball-like shape.

What I claim is:

1. In a machine for shaping dough, two endless bands arranged crosswise and means for alternately imparting a feed movement to the bands.

2. In a machine for shaping dough, two endless bands arranged crosswise, means for alternately imparting a feed movement to the bands and adapted to be set out of operation and means for imparting a continual feed movement to the bands, this last mentioned means being adapted to be set into operation.

3. In a machine for shaping dough, two endless bands arranged crosswise, means for transposing one band parallel to the other one by an angular displacement in a horizontal plane and means imparting a continual movement to the bands.

4. In a machine for shaping dough, a machine frame, two endless bands arranged crosswise, a removable frame carrying one of said bands and mounted on the machine frame and capable of being detachably connected to said machine frame upon an angular displacement in a horizontal plane and means for imparting a continual movement to both bands.

5. In a machine for kneading dough, two endless bands arranged crosswise, each band running over two rollers, means for transporting one band parallel to the other by an angular displacement in a horizontal plane, and means for guiding at least one of the inner sides of the bands between its two rollers at different points at different distances from the inner side of the other endless band.

6. In a machine for shaping dough, two endless bands arranged crosswise one upon another and each of them running over two rollers and means for guiding at least one of the inner sides of the bands between its two rollers at different points at different distances from the inner side of the other endless band.

7. In a machine for shaping dough, a machine frame, two endless bands arranged crosswise and carried by said frame, a driving pulley supported in the machine frame, a double-armed lever pivotally mounted on the machine frame, a crank actuated by said pulley and operatively connected to said lever and ratchet mechanisms actuated by said lever and adapted to impart alternately a step by step motion to said endless bands.

8. In a machine for shaping dough, a frame, two endless bands arranged crosswise, a pair of rollers for each band, rods carrying the rollers, supports for the rods carrying one pair of rollers and provided with bayonet-joint slots for detachably connecting the rods to the supports, means for simultaneously moving said supports in pairs in a vertical direction and means adapted to impart alternately to a roller of each pair of rollers a step-by-step movement.

9. In a machine for shaping dough, a frame, two endless bands, a pair of rollers for each of said bands, rods carrying these rollers, supports for the rods carrying one pair of rollers, the last mentioned rollers being detachably connected to said supports, means for vertically adjusting said supports, a driving pulley supported in the frame, means for transmitting the motion of said pulley to one of said rollers and means for transmitting the motion from this roller to a roller working together with another band than the first mentioned roller.

10. In a machine for shaping dough, a frame, two endless bands, each band running over two rollers carried by said frame, a driving pulley supported by the frame, means for transmitting the motion of said pulley to the rollers, guide pulleys acting upon one side of one of said endless bands and means adapted to effect a vertical and horizontal displacement of said guide pulleys.

11. In a machine for shaping dough, a frame, two endless bands, each band running over two rollers, means for varying the relative position between each pair of rollers, means for vertically adjusting one pair of said rollers, this pair of rollers being adapted to be transposed from one position into another one, a driving pulley and means for transmitting the motion of this pulley to said rollers.

12. In a machine for shaping dough, a frame, two endless bands, each band running over two rollers, means for varying the relative position between each pair of rollers, means for vertically adjusting one pair of said rollers, this pair of rollers being adapted to be transposed from one position into another one, a driving pulley, means for transmitting the motion of this pulley to said rollers, guide pulleys acting upon one side of one of said endless bands, a slide for each of these guide pulleys, a track for the slides provided on said frame, means for moving each slide along said track and means for vertically adjusting each guide pulley.

In testimony that I claim the foregoing as my invention, I have signed my name in presence of two subscribing witnesses.

FRIEDRICH AESCHBACH.

Witnesses:
ARNOLD LEHNER,
CARL GUBLER.

Copies of this patent may be obtained for five cents each, by addressing the "Commissioner of Patents, Washington, D. C."